United States Patent
Hall

(10) Patent No.: US 12,409,828 B2
(45) Date of Patent: Sep. 9, 2025

(54) METHOD FOR OPERATING A VEHICLE

(71) Applicant: AUDI AG, Ingolstadt (DE)

(72) Inventor: Matthew David Hall, Marbach am Neckar (DE)

(73) Assignee: AUDI AG, Ingolstadt (DE)

( * ) Notice: Subject to any disclaimer, the term of this patent is extended or adjusted under 35 U.S.C. 154(b) by 199 days.

(21) Appl. No.: 18/053,727

(22) Filed: Nov. 8, 2022

(65) Prior Publication Data

US 2023/0144775 A1 May 11, 2023

(30) Foreign Application Priority Data

Nov. 9, 2021 (DE) .......................... 102021129143.7

(51) Int. Cl.
*B60W 20/10* (2016.01)
*B60W 10/06* (2006.01)
*B60W 10/08* (2006.01)

(52) U.S. Cl.
CPC ............ *B60W 20/10* (2013.01); *B60W 10/06* (2013.01); *B60W 10/08* (2013.01); *B60W 2510/0676* (2013.01); *B60W 2510/087* (2013.01); *B60W 2710/0677* (2013.01); *B60W 2710/086* (2013.01)

(58) Field of Classification Search
CPC ...... B60W 20/10; B60W 10/06; B60W 10/08; B60W 2510/0676; B60W 2510/087; B60W 2710/0677; B60W 2710/086; B60W 20/15; B60W 30/188; Y02T 10/62; B60L 15/00
See application file for complete search history.

(56) References Cited

U.S. PATENT DOCUMENTS

| | | | |
|---|---|---|---|
| 2007/0062745 A1* | 3/2007 | Gebert | B60K 6/48 477/3 |
| 2016/0200210 A1* | 7/2016 | Burow | B60K 1/02 903/907 |
| 2017/0282750 A1* | 10/2017 | Shimizu | B60W 10/06 |
| 2021/0155112 A1* | 5/2021 | Herring | B60K 35/28 |

FOREIGN PATENT DOCUMENTS

| | | |
|---|---|---|
| DE | 102007011739 A1 | 9/2008 |
| DE | 102008035451 A1 | 3/2009 |
| DE | 102013211975 A1 | 8/2014 |
| DE | 102018128240 A1 | 5/2020 |

* cited by examiner

*Primary Examiner* — Abby Y Lin
*Assistant Examiner* — Dylan M Katz
(74) *Attorney, Agent, or Firm* — Seed Intellectual Property Law Group LLP

(57) ABSTRACT

A method for operating a vehicle comprises operating an electric machine and an internal combustion engine as the drive units, by which a total power is generated in synchronous operation for the driving of the vehicle, wherein one portion of the power of the electric machine and one portion of the power of the internal combustion engine is set in dependence on the temperature of at least one of the drive units in the total power for the driving of the vehicle.

4 Claims, 1 Drawing Sheet

METHOD FOR OPERATING A VEHICLE

BACKGROUND

Technical Field

Embodiments of the invention relate to a method for operating a vehicle and an arrangement for operating a vehicle.

Description of the Related Art

A hybrid vehicle can be driven with different drive units at the same time. The document DE 10 2008 035 451 A1 describes a method for optimization of a hybrid operation. A motor vehicle having a hybrid drive is known from the document DE 10 2007 011 739 A1.

The document DE 10 2013 211 975 A1 describes a torque superpositioning device for a hybrid drive and a method for operating such a hybrid drive.

BRIEF SUMMARY

Some embodiments provide systems and/or methods to operate a hybrid vehicle effectively.

Some embodiments include methods for the operation of a vehicle, such as a motor vehicle, comprising an electric machine and an internal combustion engine as the drive units, wherein a total power of a drive system comprising the drive units is generated by the two drive units in synchronous or simultaneous operation for the driving and/or propelling of the vehicle, wherein one portion of the power of the electric machine and one portion of the power of the internal combustion engine is set in dependence on the temperature of at least one of the drive units in the total power for the driving of the vehicle, which is configured and/or designated as a hybrid vehicle.

The portion of the power of the electric machine and the portion of the power of the internal combustion engine in the total power is set in dependence on the temperature of the electric machine and/or the internal combustion engine, i.e., in dependence on only one drive unit or in dependence on both drive units.

In one embodiment, a definable and/or maximum power for a particular operating situation is furnished and/or provided by the internal combustion engine and only a residual and/or remaining power is furnished and/or provided by the electric machine, as is required to achieve the total maximum power of the two drive units for the driving of the vehicle. It is possible for the residual power of the electric machine to be set from the total power of the drive units minus the maximum power of the internal combustion engine.

It is usually provided that the portion of the power of the internal combustion engine in the total power of both drive units is set to be greater than the portion of the power of the electric machine in the total power. However, it is likewise conceivable for the portion of the electric machine to be set greater than that of the internal combustion engine.

Furthermore, it is possible to measure the temperature of a coolant of at least or in at least one drive unit, i.e., the internal combustion engine and/or the electric machine. A portion of the power of the electric machine in the total power will be increased if the temperature of the coolant of the internal combustion engine goes beyond a limit value. The portion of the power of the internal combustion engine in the total power will be decreased accordingly. This is possible, for example, for a high-performance internal combustion engine or a high-performance combustion engine in which a very high cooling power demand generally occurs, which can be reduced in dependence on the temperature.

Accordingly, a portion of the power of the internal combustion engine in the total power will be increased if the temperature of the coolant of the electric machine goes beyond a limit value. The portion of the power of the electric machine in the total power will be decreased accordingly.

Furthermore, it is possible to increase the portion of the internal combustion engine or a combustion engine in the total power upon reduction of the total available or possibly available electrical and/or mechanical power of the electric machine. Furthermore, it is possible to increase the portion of the electric machine in the total power upon reduction of the total available or possibly available electrical and/or mechanical power of the internal combustion engine.

By staggering, comparing, balancing and/or mutual adjustment of the power of the internal combustion engine and the electric machine, taking into account the technical limits of the two drive units, the defined power of the drive system comprising the two drive units can be achieved each time. It is possible to provide for the total power of the drive system a definable maximum value, such as a constant value, resulting from the sum of the portion of the power of the electric machine and the portion of the power of the internal combustion engine, the two portions being adjusted in dependence on the current operating parameters, for example, the temperature and/or number of revolutions, and an operational situation of the two drive units, for example, in dynamic manner.

A characteristic map can be used, for example, for the two portions of the power in the total power of the drive system, which includes and/or allows for the portion of the power $P_V$ $(T_V, T_E)$ of the internal combustion engine and the portion of the power $P_E$ $(T_V, T_E)$ of the electric machine, each time depending on the temperature $T_V$ of the internal combustion engine and the temperature $T_E$ of the electric machine, it being provided for the sum of the two powers $P_V$ $(T_V, T_E)$, $P_E$ $(T_V, T_E)$ of the internal combustion engine and the electric machine that they have a constant maximum value, such as a nominal value, $P_S$, where:

$$P_S = P_V(T_V, T_E) + P_E(T_V, T_E).$$

Generally, the power $P_V$ $(T_V, T_E)$ of the internal combustion engine is determined at first in dependence on the operation. This power may vary, and on the basis of this power the power $P_E$ $(T_V, T_E)$ of the electric machine is adapted. The characteristic map can also take into account other operational parameters of the two drive units, such as the speed of revolutions, which likewise influence the powers $P_S$, $P_V$ and $P_E$. The respective values of the powers $P_S$, $P_V$ and $P_E$ are set in dependence on a particular operational situation of the drive system and/or the vehicle, it being possible to assign, require, and/or define a value of at least one of the powers $P_S$, $P_V$, $P_E$, i.e., the total power $P_S$ and/or the power $P_V$, $P_E$ of one of the two drive units, in dependence on the operational situation.

The arrangement may be designed for the operation of a vehicle, such as a motor vehicle, having a drive system, in turn comprising an electric machine and an internal combustion engine as the drive units, which are adapted to generating a total power of the drive system in synchronous operation for the driving of the vehicle. The arrangement comprises at least one thermometer for the two drive units, generally one thermometer each for a drive unit, i.e., one thermometer for the internal combustion engine and one thermometer for the electric machine, and a controller. The at least one thermometer is adapted to measure the temperature of at least one drive unit, the temperature of the internal combustion engine being measured by a first thermometer and/or the temperature of the electric machine being measured by a second thermometer. The controller is adapted to set one portion of the power of the electric machine and one portion of the power of the internal combustion engine in the total power for the driving of the vehicle in dependence on the temperature of at least one of the drive units, it being possible to compare both temperatures to each other by the controller, and it is possible to take into account a difference in the two temperatures.

In the method, the total power of the drive system is detected and/or determined by monitoring, checking, and/or evaluating the respective, usually current operating parameters, such as the temperature and/or the rotary speed, and thus the current operating state of each drive unit and hence of both drive units. In a first operating state, which can also be called the normal state, the internal combustion engine furnishes its maximum power, for example, in dependence on the operating situation. Furthermore, the electric machine furnishes only a residual power or remaining power, corresponding to the difference of the power of the drive system in the particular operating state, usually the maximum power, minus the power of the internal combustion engine, which is required in order to set and/or achieve the maximum power of the drive system.

If the temperature of the internal combustion engine rises above the limit value prescribed for this and accordingly is or becomes a problem, the portion of the power of the internal combustion engine can be reduced and the portion of the power of the electric machine can be increased. Accordingly, in the event that the temperature of the electric machine rises above the limit value prescribed for this, the portion of the power of the electric machine can be reduced and the portion of the power of the internal combustion engine can be increased. For example, the characteristic map can be used to take into account a relation between the current temperatures of the two drive units, it being conceivable to adjust dynamically at least one of the two limit values in dependence on the temperatures of the two drive units and optionally the rotary speeds of the two drive units as a further operational parameter.

By staggering the power between the internal combustion engine and the electric machine while taking into account and/or in order to take into account the technical limits of the two drive units, the defined power of the drive system or that of a hybrid drive can be achieved at all times, it being possible for the total power of the drive system to be constant. Furthermore, it is possible to hold the maximum power of the drive system constant over a longer period of time.

Thus far, the system power of a drive train is achieved by the summation of a maximum or peak power of the internal combustion engine with the maximum or peak power of the electric machine. On account of the technical limits of electrical components, such as a battery, the power electronics, and the electric machine, the maximum or peak power of the electric machine is only available with limitation over time. After this time, such as 15 seconds, the available electric power is significantly reduced.

With the method and the arrangement, it is possible to hold constant the total power of the two drive units and thus that of the drive system over a longer period of time.

Of course, the features mentioned above and yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments are presented schematically with the aid of the drawings and described schematically and in detail with reference to the drawings.

DETAILED DESCRIPTION

The figures shall be described taken together. The same reference numbers pertain to the same components.

Figure 1:
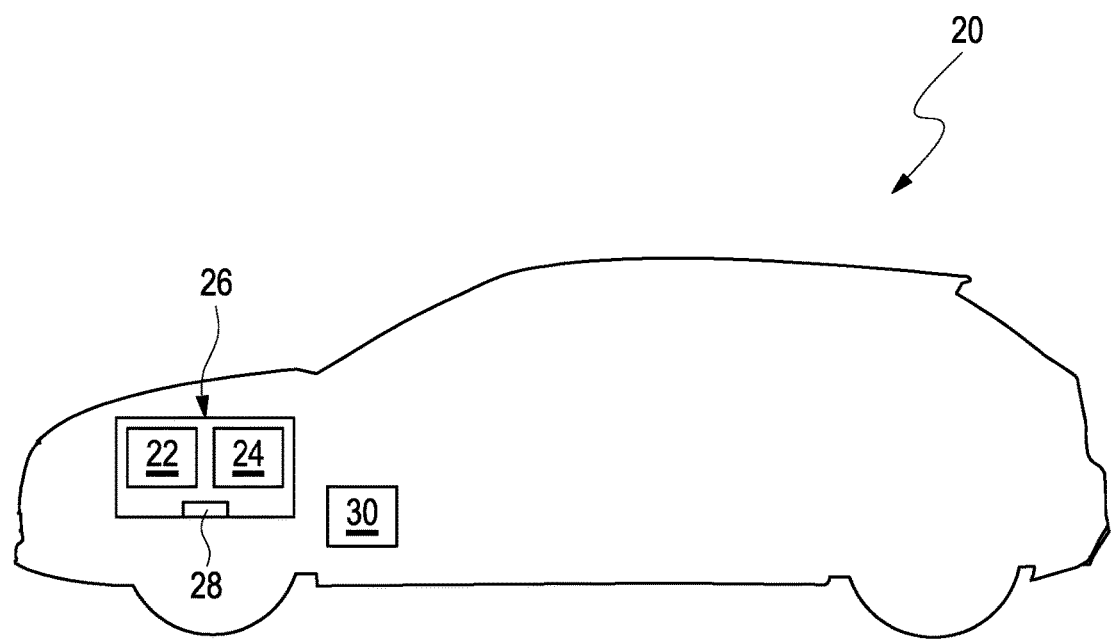
FIG. 1 shows in schematic representation a vehicle comprising one embodiment of a system.

The vehicle 20 shown schematically in FIG. 1, such as a motor vehicle, comprises an electric machine 22 and an internal combustion engine 24 as its drive units, forming a drive system 26 for the propulsion of the vehicle 20. The embodiment of the system described herein comprises at least one thermometer 28, which is associated with at least one of the two drive units and is adapted to measure its temperature. Furthermore, the system comprises a controller 30, which is adapted to monitor and thus control and/or regulate methods as described herein, as explained with the aid of the diagram in FIG. 2.

Figure 2:
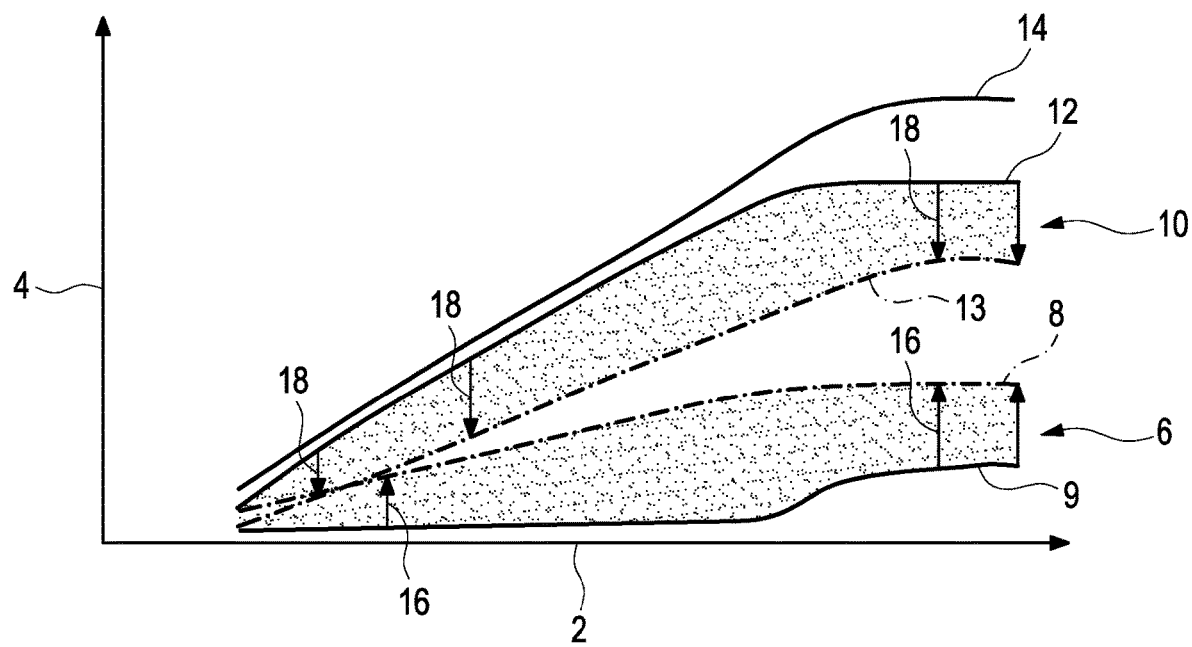
FIG. 2 shows in schematic representation a diagram with operational parameters when implementing one embodiment of a method.

The diagram in FIG. 2 has an abscissa 2, along which is plotted the rotary speed of the drive units in revolutions per minute, and an ordinate 4, along which is plotted the power of a respective drive unit and that of the entire drive system in kW. In the diagram, a first area represents a relaxation region 6 of the electric machine 22, being bounded at the top by a broken-line curve 8 for a maximum power of the electric machine 22 and at the bottom by a solid-line curve 9 for a minimum power of the electric machine 22. Furthermore, a second area represents a relaxation region 10 of the internal combustion engine 24, being bounded at the top by a solid-line curve 12 for a maximum power of the internal combustion engine 24 and at the bottom by a broken-line curve 13 for a minimum power of the internal combustion engine 24. A total target maximum power of the drive system 26 is likewise represented here by a curve 14. The result is the maximum power per curve 14 for a particular rotary speed, such as that from the sum of the maximum power of the internal combustion engine 24 (curve 12) and the minimum power of the electric machine (curve 9). Yet other powers of the internal combustion engine 24 and the electric machine 22 situated between the respective maximum power and the respective minimum power can also add up to give the target power (curve 14) of the drive system 26.

Accordingly, the diagram shows the necessary powers of the electric machine 22 and the internal combustion engine 24 with which a given and/or target power of the drive system 26 is achieved. The indicated maximum powers (curves 8, 12) of the two drive units are the powers which can be achieved at most in a particular operational situation at a particular rotary speed.

In this diagram, both drive units have in idealized manner the same rotary speed along the abscissa 2 at one operating point, such that the wheels of the vehicle 20 are driven with the same rotary speed in a hybrid drive. However, the two rotary speeds of the electric machine 22 and the internal combustion engine 24 may be different at one time, yet be synchronized by a transmission.

One portion of the power (curve 12 or curve 13) of the internal combustion engine 24 in the total power (curve 14) is set greater than the portion of the power (curve 8 or curve 9) of the electric machine 22. Furthermore, the portion of the power of the electric machine 22 and the portion of the power of the internal combustion engine 24 in the total power for the driving of the vehicle 20 are set in dependence on a temperature of at least one of the drive unit, i.e., that of the electric machine 22 and/or that of the internal combustion engine 24, these temperature being measured by the at least one thermometer 28, there being one thermometer 28 associated with each drive unit.

It is possible for the power of the internal combustion engine 24 to be reduced (negatively pointing arrow 18), starting from a particular maximum value (curve 12), and at the same time for the power of the electric machine 22 to be increased (positively pointing arrow 16), starting from a particular minimum value (curve 9).

German patent application no. 10 2021 129143.7, filed Nov. 9, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a vehicle, comprising:
synchronously operating an electric machine and an internal combustion engine of a drive system of the vehicle; and
while synchronously operating the electric machine and the internal combustion engine, generating a total power for driving the vehicle,
wherein a first portion of the total power of the drive system is generated by the electric machine and a second portion of the total power of the drive system is generated by the internal combustion engine, and
wherein the first portion of the total power of the drive system and the second portion of the total power of the drive system are set based on a temperature of the electric machine; and
while synchronously operating the electric machine and the internal combustion engine, in response to determining that the temperature of the electric machine rises above a limit value, decreasing the first portion of the total power of the drive system generated by the electric machine and increasing the second portion of the total power of the drive system generated by the internal combustion engine such that the total power of the drive system remains a constant value.

2. The method according to claim 1, wherein the second portion of the total power generated by the internal combustion engine is greater than the first portion of the total power generated by the electric machine.

3. The method according to claim 1, wherein a maximum power is provided by the internal combustion engine and a residual power is provided by the electric machine, the residual power of the electric machine being set from the total power of the electric machine and the internal combustion engine minus the maximum power of the internal combustion engine.

4. A system for operating a vehicle, comprising:
a drive system including an electric machine and an internal combustion engine;
wherein the electric machine or the internal combustion engine are synchronously operated to generate a total power for driving of the vehicle;
at least one thermometer that, in operation, measures a temperature of the electric machine; and
a controller that, in operation,
while the electric machine and the internal combustion engine are synchronously operated, sets a first portion of the total power generated by the electric machine and a second portion of the total power generated by the internal combustion engine based on the temperature of the at least one of the electric machine or the internal combustion engine; and
while the electric machine and the internal combustion engine are synchronously operated, in response to determining that the temperature of the electric machine rises above a limit value, decreases the first portion of the total power of the drive system generated by the electric machine and increases the second portion of the total power of the drive system generated by the internal combustion engine such that the total power of the drive system remains a constant value.

* * * * *